April 15, 1941.  D. E. CHAMBERS  2,238,623
CONTROL SYSTEM
Filed Dec. 14, 1937
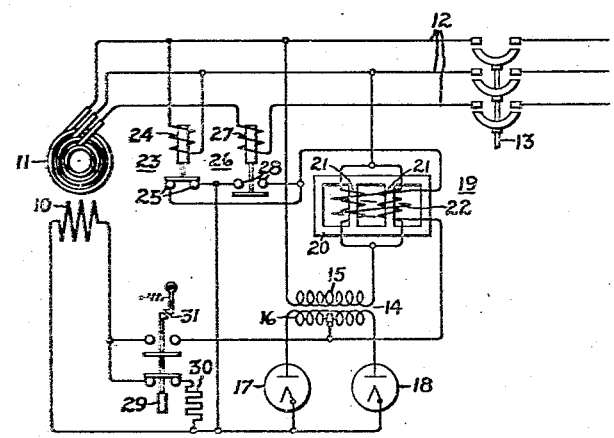
Inventor:
Dudley E. Chambers,
by Harry E. Dunham
His Attorney.

Patented Apr. 15, 1941

2,238,623

UNITED STATES PATENT OFFICE 2,238,623

CONTROL SYSTEM

Dudley E. Chambers, Schenectady, N. Y., assignor to General Electric Company, a corporation of New York Application December 14, 1937, Serial No. 179,701

4 Claims. (Cl. 172—274)

My invention relates to control systems and more particularly to electron tube control systems for electric circuits or dynamo-electric machines.

A number of electron tube control systems have been devised heretofore for regulating both electric circuits and dynamo-electric machines in accordance with various operating conditions, but most of the systems have been adapted for a precision and refinement of control which has necessitated comparatively complicated apparatus. There are certain applications of electronic control apparatus where great precision or range of control is not required. One such application is to synchronous motors. Synchronous motors for industrial applications, unless utilized for power factor control, are ordinarily operated without automatic means for controlling the field excitation and are arranged to have a field excitation sufficiently high to operate satisfactorily without breaking from synchronism for a predetermined drop in supply voltage or sustained or momentary overloads below a predetermined value. This practice requires a constantly applied reserve field excitation which does not give the most economical or efficient arrangement. Electronic devices such as rectifiers have been proposed heretofore as sources of excitation for synchronous motors but when uncontrolled, changes in the supply voltage produce corresponding changes in the field excitation so that a drop in line voltage produces a decrease in field excitation which is an undesirable condition. Arrangements have been proposed to effect proper control of the rectifier in accordance with voltage, current and power factor, but these arrangements have not presented the simplicity of control and economy conducive to general commercial application.

It is an object of my invention to provide an improved system of control for electric circuits and dynamo-electric machines which shall be simple, reliable and economical.

It is another object of my invention to provide an improved system of control for a synchronous motor receiving its field excitation from the supply circuit of the motor which shall maintain said motor in synchronous operation under the usual conditions of voltage variations and overloads encountered in practice without operating continuously with an excess reserve excitation.

It is a further object of my invention to provide an improved electronic control and system of control for synchronous motors whereby a smaller motor may be used for a given industrial application than would be required in accordance with the practice of providing continuous reserve excitation, or whereby the load imposed on a given size of motor may be increased to an amount, or the supply voltage decreased to an amount, which would otherwise be prohibitive for satisfactory operation.

In accordance with the illustrated embodiments of my invention, I provide excitation for the field winding of a synchronous motor through any suitable conventional rectifier connected to be energized from the supply circuit of the motor. Between the rectifier and the supply circuit, I interpose a voltage modifying means which lowers the voltage applied to the rectifier so as to provide proper field excitation for normal operation and normal voltage conditions, and also provide means responsive to the supply voltage or the line current automatically to change the voltage modifying means to permit energization of the rectifier so as to provide normal excitation or above normal excitation when the supply voltage decreases below a predetermined value, or the current to the motor exceeds a predetermined value.

In carrying my invention into effect, in the above arrangement briefly described, I establish a substantially constant voltage ratio between the voltage of the supply circuit and the voltage applied to the field circuit so long as the voltage or current of the motor is within a predetermined range of values by the voltage modifying means in series relation with the rectifier. That is, so long as the motor is operating within the predetermined range of values of current or voltage, the field circuit voltage is lower relative to the supply circuit voltage than when the supply circuit voltage or motor current departs from the predetermined range of values. In the latter event, the field circuit voltage is made higher than with the prior circuit adjustments for a given supply circuit voltage so that the ratio of supply circuit voltage to field circuit voltage is decreased.

My invention will be better understood from the following description taken in connection with the accompanying drawing, and its scope will be pointed out in the appended claims.

The single figure of the drawing is a diagrammatic representation of an embodiment of my invention as applied to a synchronous motor utilizing a rectifier without a control electrode.

Referring to the drawing, I have illustrated an arrangement for controlling the excitation of the field winding 10 of an alternating current dynamo-electric machine, diagrammatically represented as a three-phase synchronous motor 11, connected to be energized from a three-phase alternating current circuit 12. A switch 13 is shown in the circuit 12 as representative of a suitable means for controlling the application of voltage to the motor. The field winding 10 is connected to be energized from the supply circuit 12 through any suitable conventional rectifier 10 which may be of the single phase or polyphase type, but which, for purposes of simplicity in illustration, I have shown as a bi-phase rectifier of the single-phase type comprising a transformer 14 having a primary winding 15 and a secondary winding 16 having a pair of electric valves 17 and 18 connected to the outer terminals thereof with the field winding 10 included in the direct current circuit of the rectifier. The electric valves 17 and 18 are each represented as being provided with an anode and a cathode. Although the single-cathode, multiple-anode valves are equally suitable, and although any of the various types of single-anode or multiple-anode valves may be used, I prefer to use valves of the vapor or gaseous type such as valves of the mercury vapor type.

Between the anodes of the rectifier means and the supply circuit 12, I introduce a voltage modifying means 19. This voltage modifying means 19 is shown as connected between the primary winding 15 of the rectifier and the supply circuit 12 and as comprising a saturable reactor having a four-legged core 20 with a pair of parallel-connected oppositely wound alternating current windings 21 positioned on the two intermediate legs of the core, and a direct current saturating winding 22 surrounding the said intermediate legs. This form of reactor is disclosed in United States Letters Patent No. 1,328,610 granted January 20, 1920 upon an application of E. F. W. Alexanderson. It will occur to those skilled in the art that other suitable forms of saturable reactors may be used, such as the known forms of three-legged reactors or two separate single core devices, without departing from my invention in its broader aspects. The direct current winding 22 is connected to be energized from the direct current circuit of the rectifier. In order selectively to control the energization of the direct current winding and thereby the impedance of the voltage modifying means 19, I provide an undervoltage relay 23 having an operating winding 24 connected to be responsive to the voltage of the supply circuit 12 and having contacts 25 connected in circuit with the direct current saturating winding 22 so that this winding circuit is open when the voltage of circuit 12 is normal, and closed when the voltage of circuit 12 decreases below a predetermined value. Inasmuch as the voltage drop across the reactor 19 is but a small portion of the line voltage, the reactor size is small in comparison to the rest of the circuit apparatus with correspondingly low cost. The circuit to the rectifier is not opened during the voltage change so that the motor excitation is continuous. Similarly, an over-current relay 26 is provided with an operating winding 27 connected to be energized in accordance with the motor current and is also provided with contacts 28 in the direct current saturating circuit 22 so that the circuit of winding 22 is open when the motor current is below a predetermined value and closed when the motor current is above a predetermined value.

Any conventional automatic starting means may be utilized for starting the motor and, by way of illustration of such means, I have shown a manually operated switch 29 which in the illustrated position or lower position short circuits the field winding through a discharge resistor 30 and in the upper position disconnects the discharge resistor and connects the field winding 10 to be energized from the rectifier. The switch 29 is maintained in the upper position for normal running operation by the locking mechanism 31.

The operation of the illustrated embodiment of my invention is substantially as follows. It will be assumed that the switch 13 in the supply line has been closed, that switch 29 has been moved to its upper position and that the motor is in normal synchronous operation with normal voltage applied. Under these conditions, the contacts 25 of relay 23 will be picked up and therefore open whereas the relay 26 will be in its drop-out position with its contacts 28 open. The direct current winding 22 is not energized and the voltage modifying means has its maximum impedance. This value of impedance is so chosen in the absence of direct current saturation or bias to decrease the line voltage as applied to the anodes of the rectifier so as to provide excitation of the field winding 10 which will be sufficient for normal supply voltage conditions and normal current conditions. If the supply voltage drops or dips, for example to 70 per cent of normal for a unity power factor motor, or any other predetermined value, the undervoltage relay 23 drops out and closes its contacts 25 and thereby completes the circuit for the direct current saturating winding 22. The direct current saturation of the reactor abruptly decreases the impedance of the voltage modifying means so that a voltage only slightly less than the voltage of circuit 12 is impressed on the primary winding 15 of the rectifier transformer 14. The impedance of the voltage modifying means in its maximum and minimum conditions may be so adjusted that substantially the same excitation may be supplied to the field winding when the line voltage is normal and when the line voltage has dropped an amount corresponding to the voltage drop of the voltage modifying means. In a similar manner, if the current drawn by the motor exceeds a predetermined amount the over-current relay 26 picks up and closes its contacts 28 and thereby closes the circuit of direct current winding 22. This action will increase the excitation of the motor in the same manner as previously described and hence provide a higher pull-out torque than if the motor excitation were unchanged in accordance with the usual practice.

While I have shown and described a particular embodiment of my invention, it will be obvious to those skilled in the art that various changes and modifications may be made without departing from my invention in its broader aspects, and I, therefore, aim in the appended claims to cover all such changes and modifications as fall within the true spirit and scope of my invention.

What I claim as new and desire to secure by Letters Patent of the United States is:

1. In combination, a synchronous motor having an armature winding and a field winding, an alternating current supply circuit connected to energize said armature winding, rectifying means including electric valve means connected to energize said field winding from said alternating current circuit, a reactor interposed between said rectifying means and said alternating current circuit, said reactor having a core and an alternating current winding thereon connected in series relation with the input circuit of said rectifier and having a control winding on said core which when deenergized increases the impedance of said reactor to its maximum value and when energized decreases the impedance of said reactor to its minimum value, and relay means responsive to an electrical condition of said armature winding for maintaining said control winding deenergized for all values of said electrical condition as will permit synchronous operation of said motor with the maximum impedance value of said reactor and for energizing said control winding in one step for all other values of said electrical condition.

2. In combination, a synchronous motor having an armature winding and a field winding, an alternating current circuit connected to energize said armature winding, rectifying means including electric valve means connected to energize said field winding from said alternating current circuit, a reactor connected between said rectifying means and said alternating current circuit, said reactor having a core and an alternating current winding thereon connected in series relation with the input circuit of said rectifier and having a control winding on said core connected to be energized from the direct current circuit of said rectifier, and a relay responsive to the voltage of said armature winding for maintaining said control winding deenergized for all values of armature winding voltage above a predetermined value which is less than the rated voltage of said motor and for effecting energization of said control winding in one step to a preselected value for all values of armature winding voltage below said predetermined value.

3. In combination, a synchronous motor having an armature winding and a field winding, an alternating current circuit connected to energize said armature winding, rectifying means including electric valve means connected to energize said field winding from said alternating current circuit, a reactor connected between said rectifying means and said alternating current circut, said reactor having a core and an alternating current winding thereon connected in series relation with the input circuit of said rectifier and having a control winding on said core connected to be energized from the direct current circuit of said rectifier, and a relay connected to be energized in accordance with the current traversing said armature winding for maintaining said control winding deenergized for all values of current for which said motor will operate synchronously at the maximum impedance of said reactor and for effecting energization of said control winding in one step to a preselected value for all other values of armature current.

4. In combination, a synchronous motor having an armature winding and a field winding, an alternating current supply circuit connected to energize said armature winding, rectifying means connected to energize said field winding from said alternating current circuit, a reactor interposed between said rectifying means and said alternating current circuit and comprising a core and an alternating current winding thereon connected in series relation with the input circuit of said rectifier, said reactor being adapted to provide two preselected impedance values one of which is substantially higher than the other, and relay means responsive to an electrical condition of said armature winding for causing operation of said reactor at the higher value of said two values of impedance for all values of said electrical condition as will permit synchronous operation of said motor at said higher value of impedance and for controlling said reactor to reduce its impedance in one step to said second preselected value of impedance for all other values of said electrical condition.

DUDLEY E. CHAMBERS.